United States Patent [19]

McCormick

[11] Patent Number: 5,060,837

[45] Date of Patent: Oct. 29, 1991

[54] METHOD AND APPARATUS FOR SEVERING AN OPTICAL FIBER

[75] Inventor: Larry L. McCormick, Los Angeles, Calif.

[73] Assignee: G & H Technology, Inc., Camarillo, Calif.

[21] Appl. No.: 604,193

[22] Filed: Oct. 29, 1990

[51] Int. Cl.[5] ............................................. B26F 3/00
[52] U.S. Cl. ........................................ 225/1; 225/100; 225/103
[58] Field of Search ........................ 244/3.12; 102/293; 225/1, 93, 96.5, 97, 103, 100; 83/639.4, 639.7; 29/566.3, 566.1, 564.6

[56] References Cited

U.S. PATENT DOCUMENTS

| | | | |
|---|---|---|---|
| 960,779 | 6/1910 | Basim | 225/93 |
| 3,144,394 | 8/1964 | Fifield | |
| 3,895,552 | 7/1975 | Lagofun | 83/639.4 |
| 4,456,159 | 6/1984 | Roberts et al. | 225/93 X |
| 4,530,452 | 7/1985 | Balyasny et al. | 225/96.5 X |
| 4,540,109 | 9/1985 | Runkle | 225/93 X |
| 4,565,310 | 1/1986 | Krause | 225/96.5 X |
| 4,662,710 | 5/1987 | ten Berge | 350/96.10 |
| 4,721,355 | 1/1988 | Gould | 350/96.20 |
| 4,852,244 | 8/1989 | Lukas | 29/566.3 |
| 4,860,968 | 8/1989 | Pinson | 244/3.12 |
| 4,936,675 | 6/1990 | Stevenson | 356/73.1 |

Primary Examiner—Frank T. Yost
Assistant Examiner—Rinaldi Rada
Attorney, Agent, or Firm—George J. Netter

[57] ABSTRACT

First and second tube sections (12, 14) are dimensioned so as to enable telescoping receipt of an end portion of one within the other. A pair of parallel slots (36) in the end portion of the second tube section (14) is slidingly received onto a break pin (28) transversely secured within the first tube section (12). A further break pin (38) is transversely secured within the end portion of the second tube section (14). An optical fiber cable (17) passes through the tube sections and between the break pins (28, 38) such that on the tube sections being axially separated, the fiber cable conforms about the break pins in relatively small radii severing the fiber cable.

6 Claims, 1 Drawing Sheet

5,060,837

METHOD AND APPARATUS FOR SEVERING AN OPTICAL FIBER

BACKGROUND OF THE INVENTION

1. Field of the Invention

The present invention pertains generally to optical fiber cables and, more particularly, to a means and method for severing such optical fiber cables.

2. Description of Related Art

There are many situations in which optical fibers are used as the main information transmission technique and it is desirable or necessary to physically break or sever the fibers quickly upon completion of transmission. For example, certain missiles maintain an optical fiber data link between the missile and launch site equipment for a part of the flight after which the data link is physically broken. One known technique for severing or breaking an optical fiber is to use a device, sometimes referred to as a "guillotine", which includes a blade-like member that literally cuts through the fibers. Such devices are bulky, heavy and complicated and can be dangerous. Also, they require an optical, electrical or physical stimulus for initiating operation, and a relatively large amount of energy is required for operation. Another known technique consists of weakening the fiber at some desired location and then stressing the fiber in tension to produce severance. U.S. Pat. No. 4,027,814 describes such a technique and device.

A still further technique is that disclosed in U.S. Pat. No. 4,662,710 where a fiber is first surrounded by an elastomeric material in the desired break region. Then, the elastomeric material is compressed towards the axis of the fiber resulting IN breakage. In all known techniques and apparatus for achieving a breakage of a one or more optical fiber cables, the apparatus required is relatively complex, difficult to use, and costly to make.

SUMMARY OF THE INVENTION

The apparatus for achieving severance of an optical fiber cable in accordance with the practice of the present invention includes a pair of tube sections, one having an outer diameter such that it can be telescopingly received within the end of the other tube section. The smaller diameter tube has a slot extending rearwardly from an open end a predetermined amount. On the inner surface of the tube including the slot, there is a small diameter pin which extends transversely of the tube section and generally parallel to a plane defined by the slot and tube axis. The larger diameter tube section has an internal pin which extends transversely across the tube bore.

In use, the fiber to be acted upon passes through both of the tube sections and is arranged to extend along opposite sides of the two tube pins in a somewhat S-shape. A locking or shipping protector secures the two tubes together so that they cannot be moved in a longitudinal manner with respect to one another.

When the locking protector is removed and assuming that it is desired to sever the optical fiber, the two tubes are moved axially away from one another which causes the internal pins to engage the optical fiber and form it into a pair of small diameter radii which by virtue of the brittleness of the optical fiber core and the relatively poor resistance of glass or quartz to tensile forces causes the fiber to break.

DESCRIPTION OF A PREFERRED EMBODIMENT

Figure 1:
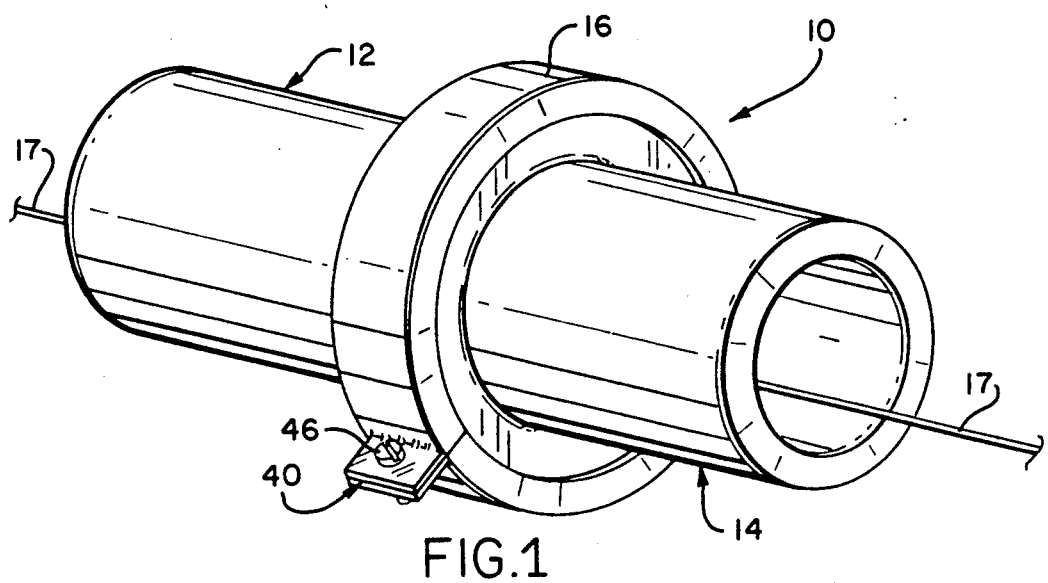
FIG. 1 is a perspective view of apparatus for severing an optical fiber in accordance with the present invention.

With reference now to the drawing and particularly FIG. 1, the device of the present invention for achieving severance of one or more fiber optic cables is enumerated generally at 10. More particularly, the device includes first and second hollow tubular sections 12 and 14 that slidingly and telescopingly interfit in a way that will be described An annular lock 16 is received about abutting parts of the tube sections removably securing them together against axial movement. A fiber cable 17 is shown passing through the two tube sections and as will be described is severed by the device 10 when the annular lock 16 has been removed and the two tubular sections are moved axially away from one another.

Figure 2:
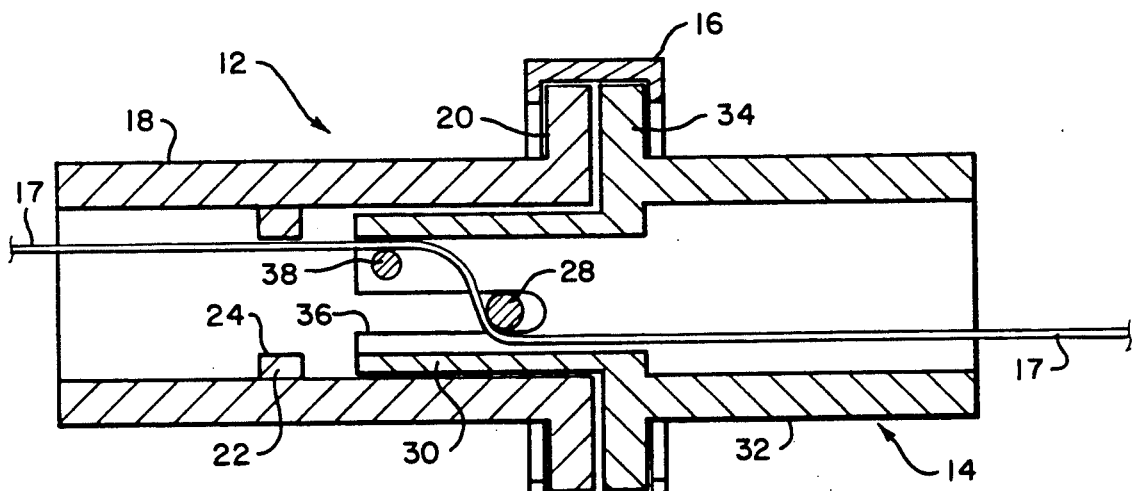
FIG. 2 is a side elevational sectional view of the invention taken along the lines 2—2 of FIG. 1.

As can be seen best in FIG. 2, tubular section 12 consists of hollow cylindrical body member 18 having an annular radially outwardly extending flange 20 at one end. An inwardly directed flange 22 is located on the inner wall of the cylindrical body and spaced axially from the flange 20. A central opening 24 defined by the edges of flange 22 enables the fiber cable 17 to pass completely through the tube section 12.

A cylindrical break pin 28 has one, and preferably both, its ends secured to the internal well of body 18 and extends across the internal bore of the tube section 12 at a position located off the body axis. The pin has a smooth exterior surface so as not to inadvertently damage the fiber cable.

Tube section 14 includes a hollow cylindrical part 30 with an external diameter enabling sliding and telescopic receipt within the open end of the tube section 12. A further part of the tube section 14 identified as 32 is of larger diameter than the part 30 and has a flange 34 that extends radially outward defining the point of interconnection between the parts 30 and 32. When the part 30 is telescopically received within the tube section 12 as shown in FIG. 2, the flanges 20 and 34 can abut against each other and present a smooth continuous circumferential surface.

A pair of elongated slots 36 extend from the open forward end of the cylindrical part 30 rearwardly a predetermined distance. These slots are aligned forming an eccentric plane off the cylindrical axis sufficiently so that when the part 30 is received within the tube section 12 the slots will engage and slide over the break pin 28.

A further break pin 38 is located just inwardly of the open end of the cylindrical part 30 and extends parallel to the plane formed by the two slots 36 and located on the opposite side of the cylindrical axis from the slots. When the two tube sections are mated as shown in FIG. 2, the two break pins 28 and 38 are substantially parallel to one another.

For the ensuing description of the annular lock 16 reference is made simultaneously to both FIGS. 1 and 2. The lock includes a ring-like member that in cross-section is U-shaped and has a single separation cut 40. It is contemplated that the lock should be made of a flexible material enabling separation of the end portions at the cut 40 a sufficient amount so that it may be received over the flanges as shown in FIG. 2. The two ends may be clampingly related to one another via a threaded member 46, for example. When in place, the annular lock secures the two tube sections 12 and 14 against axial movement in a separation direction while the flanges 22 and 34 abut against one another preventing further axial movement toward one another.

In assembly, the fiber cable to be severed passes along the tube section 14 internal bore and outwardly of the break pin 28, i.e. between the break pin and the internal wall of the cylindrical part 30. Next, the fiber moves transversely across the bore of the cylindrical part 30 passing outwardly of the further break pin 38 (between the pin and the wall of the cylindrical part 30) and, finally, out of the tube section 12. It is important to note that the two break pins are axially separated from one another along the tubular axis a sufficient amount so that the fiber cable is not subjected to a sharp bend but merely a smooth shallow curve when assembled as described.

Figure 3:
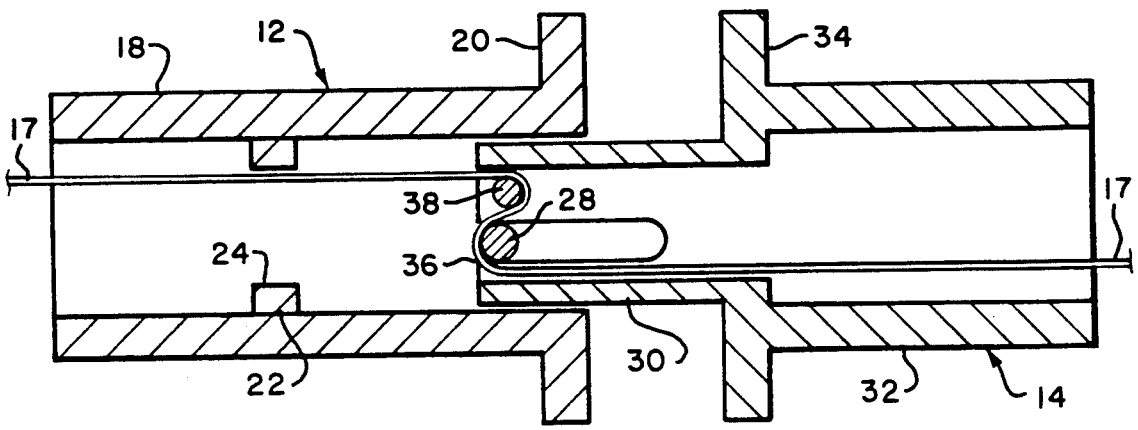
FIG. 3 is a further side elevational sectional view similar to FIG. 2 showing the parts separating and effecting optical fiber severance.

In the event that the described device is to be used in connection with a missile, for example, the annular lock 16 is removed just before flight. To sever the cable, the tube sections 12 and 14 are moved away from each other axially as depicted in FIG. 3, the one part going with the missile and the other part being jettisoned, for example. With this relative movement of the tube sections, the fiber is then subjected to two sharp radii, one at each of the pins 28 and 38, which because of the poor tensile stress resistance characteristics of the glass or quartz composing the optical fiber cable 17 causes the cable to break. This severing is accomplished with optimally small amount of initiation pressure or actuation energy and without the complexity and cost of manufacture associated with guillotine devices, for example.

Although the invention has been described in connection with a preferred embodiment, it is to be understood that modifications can be made that are within the spirit of the invention and the ambit of the appended claims.

What is claimed is:

1. A method of breaking an optical fiber, comprising the steps of:
   looping the fiber loosely about two spaced apart cylindrical pins, said pins each having such a relatively small diameter that an optical fiber conforming to the pin outer surface will break; and
   moving the pins with respect to each other in such direction as to tighten the fiber looping and conform the fiber to each pin cylindrical surface.

2. A method as in claim 1, in which the pins are moved past each other forming tight fiber loops about each pin to break the fiber.

3. An optical fiber cable severing device, comprising:
   a first hollow, open-ended tube section;
   a first break pin affixed to an inner wall of the first tube section and extending transversely of the tube section axis;
   a second hollow, open-ended tube section having a cylindrical end part of such dimensions as to enable telescoping sliding receipt within an end of the first tube section, said cylindrical end part having a pair of aligned sidewall slots dimensioned for sliding receipt onto the first break pin; and
   a second break pin mounted on the interior wall of the cylindrical end part adjacent the outer end thereof and extending generally transversely of the cylindrical end part axis;
   said optical fiber cable being assembled about the break pins such that upon the first and second tube sections being moved apart the cable is formed into a generally S-shape configuration of increasingly smaller radii.

4. Optical fiber cable severing apparatus as in claim 3, in which there are further provided first and second radially outwardly extending flanges on said first and second tube sections, respectively, which flanges abut against each other on assembly of the tube sections.

5. Optical fiber cable severing apparatus as in claim 4, in which said first break pin is located adjacent the first tube section end through which the second tube section is received, and said second break pin is located adjacent the second tube section leading end on being received within the first tube section, so that on the tube sections being fully assembled with the first and second flanges abutting against each other the second break pin is positioned farther within the first tube section than the first break pin.

6. Optical fiber cable severing apparatus as in claim 3, in which the first and second break pins each have both ends secured to the opposite interior walls of the respective tube sections.

* * * * *